Feb. 17, 1953    R. O. JESSUP    2,628,851
FLEXIBLE VENTILATED COUPLING
Filed Oct. 17, 1950
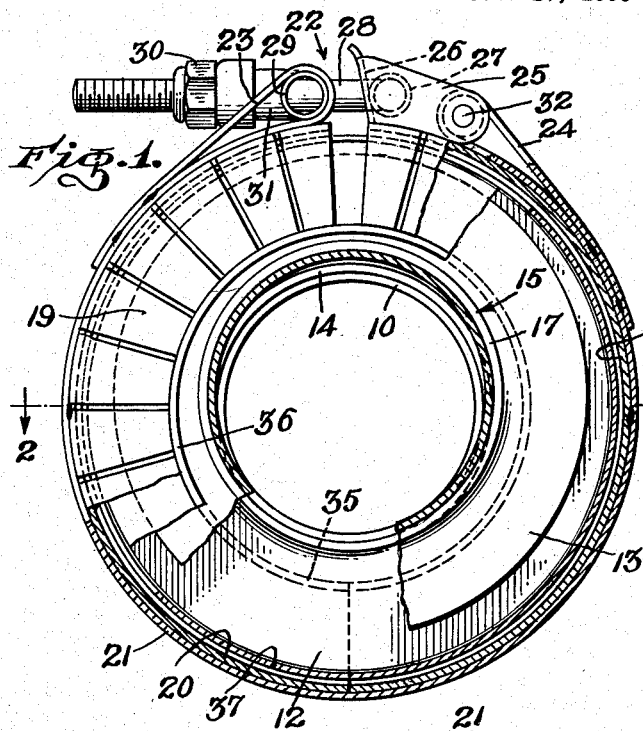
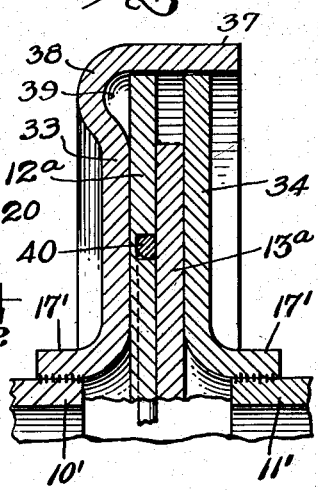
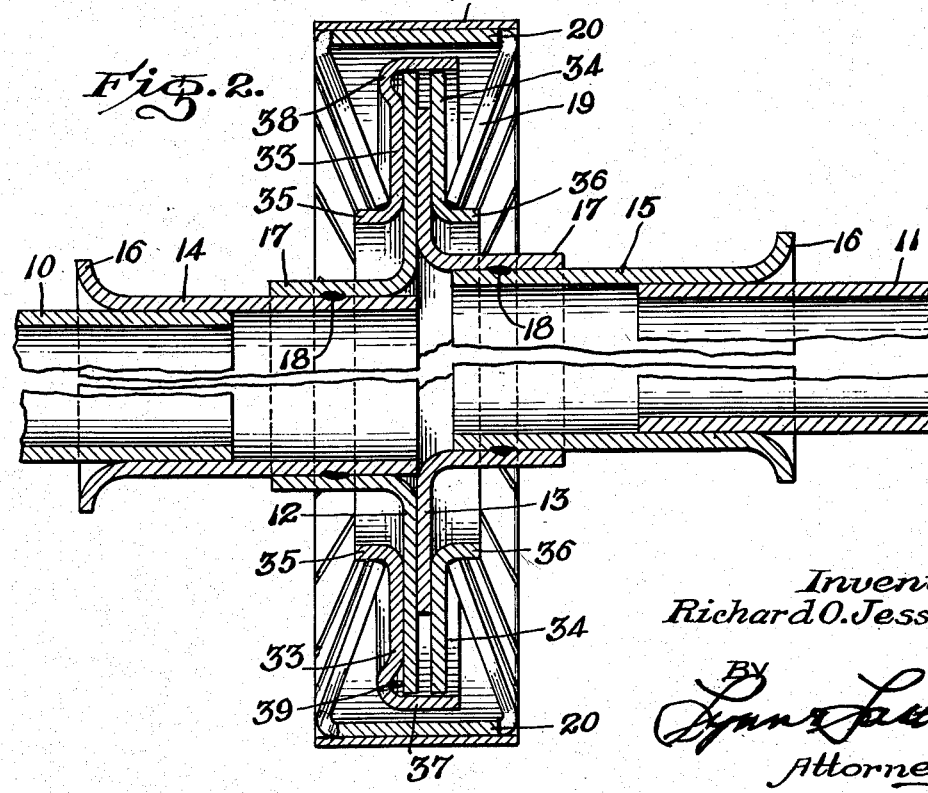
Inventor
Richard O. Jessup
By Lynn Latta
Attorney.

Patented Feb. 17, 1953

2,628,851

UNITED STATES PATENT OFFICE 2,628,851

FLEXIBLE VENTILATED COUPLING

Richard O. Jessup, Los Angeles, Calif., assignor to Marman Products Co., Inc., Inglewood, Calif., a corporation of California Application October 17, 1950, Serial No. 190,513

4 Claims. (Cl. 285—129)

1

This invention relates to a self-aligning tube coupling, and has as its general object to provide a tube coupling of the type in which radially inward forces derived from the constriction of a constrictor band are converted into axial pressures for establishing a fluid tight seal between flanges associated with respective tube sections to be coupled, the coupling being particularly characterized by the embodiment of means for maintaining the seal while allowing axial misalignment of the tube sections.

The use of packing rings in a coupling which provides for radial shifting movement between the tube sections that are coupled, presents a more difficult problem than in the more common cases where the tube sections are rigidly connected in immovable relation to each other. Accordingly, a further object of the invention is to provide a self-aligning coupling providing for relative radial shifting movement between coupled tube sections, and obtaining a fluid-tight seal without the use of packing rings of compressible material or the like, i. e., in which the seal is obtained by metal to metal contact of flanges on the ends of the respective tube sections. To this end, the invention contemplates the employment, in a coupling having flanges that are arranged for relative radial shifting movement, of means for effectively establishing a high compressive engagement between said flanges while allowing the relative radial shifting movement. More specifically, in this connection, the invention aims to provide a coupling in which such axial sealing pressure between the flanges is derived from radially inwardly directed forces produced by the circumferential foreshortening of a constrictor band.

A further object is to provide, in a coupling of the type indicated above, an arrangement in which the constricting forces of the constrictor band are converted into axial flange sealing forces by means of inwardly converging fingers functioning with a toggle action, with their outer ends subjected to the purely radial forces of the constrictor band and their inner ends transmitting axial components to the sealing flanges. A further object is to provide, in such a coupling, an arrangement wherein the inner ends of the toggle fingers may at all times act at a common circumference while allowing relative radial shift between the flanges to which they transmit the axial pressure components.

Other objects will become apparent in the ensuing specifications and appended drawings in which:

Fig. 1 is a side view, partially broken away and

2 in section, of a coupling embodying the invention;

Fig. 2 is an axial sectional view thereof taken on the line 2—2 of Fig. 1;

Fig. 3 is a detail, fragmentary axial sectional view of a coupling embodying a modified form of the invention.

As an example of one form in which the invention may be embodied, I have shown in Figs. 1 and 2 a coupling in which a fluid tight seal is established by metal to metal contact of flanges carried on the ends of respective tube sections 10 and 11, to be coupled. The sealing flanges are in the form of flat annular disks or flanges 12 and 13. The engaging faces of flanges 12 and 13 are flat in order that they may maintain a fairly extensive area of sealing contact in all positions of relative radial shifting adjustment thereof. For best results, the engaging faces of these flanges are machined to a fairly high finish (e. g., to the extent of a lapped, or, in some cases a polished finish).

The invention contemplates the possibility of having flanges 12, 13 either directly attached to tube sections 10, 11 or formed integrally therewith. However, in some installations, it may be desirable to provide for universal adjustment between the tube sections including not only the radial shift to compensate for axial misalignment, but also longitudinal telescoping movement to accommodate relative axial shift between the tube sections. To provide for such situations, the invention may, as in the embodiment shown in Figs. 1 and 2, utilize connecting sleeves 14, 15 having belled mouths 16 facilitating the insertion of tube sections 10, 11 into such connecting sleeves. In some cases, it may be desirable to weld a connecting sleeve 14 or 15 to a tube section 10 or 11, whereas in other cases it may be considered necessary to leave a sliding, telescoping joint between one or both of the connecting sleeves 14, 15 and the respective tube sections. In the latter case, it would of course be difficult to maintain a fluid tight seal, especially in cases where the fluid is passed through the coupling under pressure. However, in some installations such as in the coupling of engine exhaust pipes, the pressure seal may not be essential, and in such case, the engaging faces of flange 12, 13, need not be developed to a high degree of finish.

Flanges 12, 13, are provided with collars 17 which receive the unflanged ends of connector sleeves 14, 15 and are joined thereto by suitable means, such as by rings of welding 18.

In some cases, connector sleeves 14, 15 may be dispensed with and the flanges 12, 13 connected directly to the tube sections 10, 11. For example, as illustrated in Fig. 3, collars 17' may be welded directly to tube sections 10', 11'.

Axial pressure is derived from the toggle action, under radial compression, of a series of toggle struts 19 which converge inwardly from the respective sides of a pressure resolving ring 20. While the invention contemplates the possibility of utilizing an arrangement, such as that shown in the pending application of Houghton and Woolsey, Ser. No. 680,802, filed July 1, 1946, in which at least some of the struts are hingedly connected to the force resolving ring, or an arrangement such as that shown in prior Patent No. 2,457,077, in which either some or all of the struts are separate parts having their outer extremities in abutting engagement with suitable confining flanges or shoulders on the force resolving ring, I have shown herein, as a simple form of the arrangement of force transmitting ring 20 and toggle struts 19, an arrangement in which the struts 19 are formed as integral fingers projecting inwardly from the respective sides of transmitting ring 20. The invention may however utilize any of the alternative arrangements referred to above and is not restricted to the integral arrangement shown herein.

Force transmitting ring 20 is subjected to radial compressive forces through the constricting action of a constrictor band 21, acting in response to circumferential take-up developed by a connector unit 22.

The ends of band 21 are looped back upon themselves to form loops 23, 24 which are joined by take-up connector 22. Connector 22 in itself forms no part of the present invention, being of a conventional type. Describing the connector for identification purposes, it comprises a yoke or socket 25 having a web portion 26 which is provided with a notch (not shown) to receive the stem of a T-bolt 28 so that head 27 of bolt 28 may be received in socket 25. T-bolt 28 extends through registering openings in a tubular cross bar 29 the ends of which are engaged in separated sections of loop 23 (of bifurcated form—not illustrated—to receive bolt 28) a tightening nut 30 being threaded onto the end of bolt 28 and transmitting pressure to cross bar 29 through a suitable pressure transmitting collar 31. Socket 26 is connected by a suitable cross pin 32 to loop 24.

Axial components of the radial compression to which struts 19 are subjected, are transmitted from the inner ends of struts 19 to sealing flanges 12, 13 by means of pressure rings 33, 34. In order that the radial compressive forces may be resolved into axial components, inward movement of the inner ends of struts 19 is restricted by the abutting engagement of said inner ends with collars 35, 36 formed integrally with the inner margins of pressure rings 33, 34, and projecting axially away from each other. Collars 35, 36 function as abutment shoulders or fulcrums against which the inner ends of struts 19 pivot as they press the rings 33, 34 toward each other so as to clamp the flanges 12, 13 into sealing contact with each other. The collars 35, 36 prevent inward movement of the inner ends of struts 19 so that the inward compression of force transmitting ring 20 will be resolved, by the toggle action of struts 19, into axial components pressing the pressure ring 33, 34 tightly against flanges 12, 13.

In order that the forces acting in the struts on one side may be properly balanced against those acting in the struts on the other side, means is provided to maintain collars 35, 36 at all times in coaxial alignment. Such means comprises a cylindrical rim flange 37 within which the unflanged periphery of pressure ring 34 is piloted. The fit of ring 34 within rim flange 37 is sufficiently snug to maintain accurately the alignment of collars 35, 36, but sufficiently loose to allow freedom of axial movement of pressure rings 33 and 34 in clamping the flanges 12, 13 between them. With the collars 35, 36 thus maintained in alignment, there will be maximum efficiency of resolution of compressive forces into axial sealing forces.

In order to provide for maximum area of sealing engagement between flanges 12 and 13 in various positions of relative radial displacement thereof, flanges 12 and 13 are of different diameters, with flange 12 having the maximum diameter allowed by its assembly within rim flange 37, and flange 13 having a minimum diameter dictated by the desired extent of relative radial shift between the flanges. Thus the maximum extent of radial shift permitted in the coupling, from the position of coaxial alignment of tube sections 10, 11 to any position of maximum displacement, is the difference between the peripheral radii of flanges 12, 13.

It will now be apparent that the coupling is maintained in coaxial relation to tube section 10 while tube section 11 and flange 13 may shift radially with reference to the major coupling assembly.

A rounded clearance space 39 between pressure plate 33 and its rim flange 37 is provided by an annular bead 38 joining the flange to the pressure ring. This assures a flat engagement between pressure ring 33 and flange 12, inwardly of the peripheries thereof, and avoids the concentration of axial pressure transmission between the two at the extreme periphery of flange 12, which would tend to distort the flange from a truly flat plane and to destroy the flat face to face sealing engagement between flanges 12, 13. Preferably, the clearance space 39 which is defined by beaded corner 38 is of sufficient radial extent to concentrate the axial pressure of ring 33 in an area beginning at a substantial distance inwardly of the rim of flange 12, said area corresponding generally to the maximum area of interengagement between flanges 12 and 13 under most conditions.

In the modified form disclosed in Fig. 3, flange 12a has an annular face groove 40 in its sealing face, and an O-ring 41 is seated in groove 40 and yieldingly engages the adjacent face of flange 13 to effect a seal.

Where only a relatively small degree of misalignment is provided for, the tube sections and sleeves 14, 15 may, as shown, be of substantially the same diameter. Where considerable misalignment is provided for, however, the downstream tube section may be of a larger diameter so as to avoid any throttling of flow through the coupling when the tube sections are offset relative to each other.

I claim:

1. In a coupling for joining tube sections: a pair of radially extending flanges on the ends of the respective tube sections, one of said flanges being of larger diameter than the other; a first pressure ring having an axially projecting rim, a second pressure ring of the same diameter as the larger flange, said first pressure ring receiving and being fitted to the peripheries of the larger flange and said second pressure ring, said first and second pressure rings being in face to face embracing engagement with the larger and smaller tube flanges respectively and each having an axially projecting collar encircling a respective tube section and having radial clearance with respect thereto, whereby the smaller flange and the tube section attached thereto may shift radially with respect to the remainder of the assembly for accommodating misalignment between the tube sections, said collars projecting away from the respective tube flanges and cooperating with respective pressure rings, where they are joined thereto, to define annular corners; a constricting band; means for circumferentially constricting the same; and pressure transmitting means converging inwardly from respective sides of said constricting band and engaged in said corners to resolve radially constricting forces into axial forces pressing said pressure rings against said flanges; said second pressure ring being arranged for axial floating movement within said rim of the first pressure ring, whereby said pressure rings may distribute said axial forces uniformly about the whole circumference of the area of application of said axial forces.

2. In a coupling for joining tube sections: a pair of radially extending flanges on the ends of the respective tube sections, one of said flanges being of larger diameter than the other; a first pressure ring having an axially projecting rim; a second pressure ring of the same diameter as the larger flange, said first pressure ring receiving and being fitted to the peripheries of the larger flange and said second pressure ring respectively, said pressure rings embracing said flanges in face to face engagement and each having at its inner margin an axially projecting collar encircling a respective tube section; said collars projecting away from the respective tube flanges and cooperating with respective pressure rings, where they are joined thereto, to define annular corners, the pressure ring which is in engagement with the smaller tube flange having defined by its said collar, a central opening of larger diameter than the tube section projecting therethrough; so as to provide radial clearance for self aligning movements of said tube section and said collar flange with respect to the remainder of the assembly; a constricting band; means for circumferentially constricting the same; and pressure transmitting means converging inwardly from respective sides of said constricting band and engaged in said corners to resolve radially constricting forces into axial forces pressing said pressure ring against said flanges; said second pressure ring being arranged for free axially floating movement within said rim of the first pressure ring, whereby said pressure rings may distribute said axial forces uniformly about the full circumference of the area of application of said axial forces.

3. In a coupling for joining tube sections: a pair of radially extending flanges on the ends of the respective tube sections, one of said flanges being of larger diameter than the other; a first pressure ring having an axially extending rim receiving and fitted to the periphery of the larger of said tube flanges; a second pressure ring received and axially floating within said rim, said pressure rings being of stamped sheet metal, embracing said flanges in face to face engagement therewith and each having at its inner margin axially projecting abutment means, said inner margins defining central openings receiving respective tube sections, the central opening of the pressure ring which engages the smaller tube flange being of larger diameter than the tube section extending therethrough so as to have, with respect thereto, radial clearance permitting said last mentioned tube section to shift radially for accommodating misalignment between the tube sections, said smaller tube flange likewise having radial clearance within said rim, accommodating said radial shifting; said abutment means projecting away from the respective adjacent tube flanges and cooperating with the respective pressure rings, where they are joined thereto, to define abutment corners; a constricting band; means for circumferentially constricting the same; and pressure transmitting means converging inwardly from the respective sides of said constricting band for resolving constricting forces into axial forces pressing said pressure rings against said flanges; said second pressure ring being arranged for free axially floating movement within said rim of the first pressure ring, whereby said pressure rings may distribute said axial forces uniformly about the full circumference of the area of application of said axial forces.

4. A coupling as defined in claim 3, wherein said first pressure ring has a beaded corner portion joining said rim to the flange engaging body portion thereof, said beaded corner portion projecting axially on the opposite side of the plane of said body portion from the side on which said rim projects, whereby to provide a corner clearance space in which the peripheral portion of the larger tube flange is accommodated out of contact with said first pressure ring.

RICHARD O. JESSUP.

REFERENCES CITED

The following references are of record in the file of this patent:

UNITED STATES PATENTS

| Number | Name | Date |
| --- | --- | --- |
| 1,632,042 | Price | June 14, 1927 |
| 1,819,086 | Friend | Aug. 18, 1931 |
| 2,457,077 | Woolsey | Dec. 21, 1945 |